(12) United States Patent
Balchandran et al.

(10) Patent No.: US 7,386,440 B2
(45) Date of Patent: Jun. 10, 2008

(54) METHOD, SYSTEM, AND APPARATUS FOR NATURAL LANGUAGE MIXED-INITIATIVE DIALOGUE PROCESSING

(75) Inventors: Rajesh Balchandran, Elmsford, NY (US); Linda M. Boyer, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 10/676,524

(22) Filed: Oct. 1, 2003

(65) Prior Publication Data

US 2005/0075878 A1    Apr. 7, 2005

(51) Int. Cl.
*G06F 17/27* (2006.01)

(52) U.S. Cl. .................. 704/9; 704/257; 704/270; 704/275

(58) Field of Classification Search .............. 704/275, 704/1, 245, 270, 239, 9, 257; 379/88.18, 379/88.04, 88.23
See application file for complete search history.

(56) References Cited

U.S. PATENT DOCUMENTS

| | | | |
|---|---|---|---|
| 6,144,989 A | 11/2000 | Hodjat et al. | |
| 6,260,059 B1 | 7/2001 | Ueno et al. | |
| 6,263,051 B1 | 7/2001 | Saylor et al. | |
| 6,292,548 B1 | 9/2001 | Jreij et al. | |
| 6,349,132 B1 | 2/2002 | Wesemann et al. | |
| 6,356,869 B1* | 3/2002 | Chapados et al. | 704/275 |
| 6,735,560 B1 | 5/2004 | Epstein | |
| 7,197,460 B1* | 3/2007 | Gupta et al. | 704/270.1 |
| 2002/0103837 A1 | 8/2002 | Balchandran et al. | |
| 2003/0061029 A1* | 3/2003 | Shaket | 704/9 |
| 2003/0130849 A1* | 7/2003 | Durston et al. | 704/270 |
| 2003/0191625 A1* | 10/2003 | Gorin et al. | 704/1 |

OTHER PUBLICATIONS

U.S. App. No. 09/773,083, filed Jan. 31, 2001, Balchandran et al.
U.S. Appl. No. 09/773,172, filed Jan. 31, 2001, Epstein.

* cited by examiner

*Primary Examiner*—Richemond Dorvil
*Assistant Examiner*—Natalie Lennox
(74) *Attorney, Agent, or Firm*—Akerman Senterfitt

(57) ABSTRACT

In a natural language, mixed-initiative system, a method of processing user dialogue can include receiving a user input and determining whether the user input specifies an action to be performed or a token of an action. The user input can be selectively routed to an action interpreter or a token interpreter according to the determining step.

7 Claims, 4 Drawing Sheets

METHOD, SYSTEM, AND APPARATUS FOR NATURAL LANGUAGE MIXED-INITIATIVE DIALOGUE PROCESSING

BACKGROUND

1. Field of the Invention

The invention relates to the field of dialogue-based systems and, more particularly, to dialogue-based systems that incorporate natural language understanding technology.

2. Description of the Related Art

Dialogue systems serve as interfaces through which users can query an information processing system for information or direct an information processing system to perform an action. One variety of dialogue system is a directed dialogue system. A directed dialogue system controls the flow of dialogue with a user through a structured set of menu choices. The user is prompted for a single item of information at each point within the menu hierarchy. The user responds to each prompt, providing responses in serial fashion until the dialogue system obtains the information needed to respond to the user's query or perform the user-specified action. Within directed dialogue systems, the user must proceed through the menu hierarchy, providing requested information in the order in which the dialogue system asks, without deviation.

Another type of dialogue system, which can be referred to as a natural language (or free-form) mixed-initiative dialogue system, a conversational dialogue system, or a conversational natural language system, allows the caller to take control of the dialogue at any point if desired. Otherwise, the dialogue flows in a pre-defined manner with the system prompting the user for one item of information at a time. Control of the dialogue can alternate between the user and the mixed-initiative system, hence the name. A mixed-initiative system also allows a user to phrase a request in a natural manner, providing as much or as little information as the user wishes in the same way the user would interact with a human operator. As a result, a transaction that would take several turns in a directed dialogue system can potentially be completed in a single turn.

A mixed-initiative system typically starts a dialogue by asking the user an open ended question such as "How may I help you?" This starting point of the dialogue is referred to as the Main Menu state. When in the Main Menu state, the user can take control of the dialogue and issue a request for anything within the scope of the information processing system. The following are examples of such user initiated requests in the context of the Main Menu state:

```
System:   How may I help you?
User:     I'd like to transfer $4000.00 to the Growth fund.
System:   How may I help you?
User:     What is my balance in the Growth fund?
```

When processing a user-initiated request, the mixed-initiative system needs to determine the task or action that the user has requested, in this case transferring money or determining the balance of an account. The mixed-initiative system must also identify any tokens of information that the user has provided with the request, such as the amount to be transferred, the account, or fund for which the balance is to be determined. The mixed-initiative system performs the action if all tokens required for the action have been determined.

If further tokens of information are necessary before the action can be performed, for example the source from which money will be transferred, the mixed-initiative system enters a token gathering state. In the token gathering state, the mixed-initiative system takes control of the dialogue by asking for any missing or ambiguous tokens of information through a series of directed, system-initiated prompts. The system can prompt for one or more tokens of information at that time. When in the token gathering state, the user often responds directly to the system-initiated prompts, providing the token(s) of information that were requested. The following are examples of such system-initiated or context dependent responses in the token gathering state:

```
System:   From which fund would you like to transfer $4,000.00?
User:     From the Fixed Income fund.
System:   Confirming your request to transfer $4,000.00 from the Fixed
          Income fund to the Growth fund. Is this correct?
User:     Yes.
System:   From which airport in New York do you want to pick up
          the car?
User:     LaGuardia.
System:   On what date will you return the car?
User:     A week from next Tuesday.
```

Within a mixed-initiative application, the user may choose to take control of the dialogue at any point in time. When in the token gathering state, the user may choose not to respond directly to a system-initiated prompt, and instead, respond out of context, issuing a new user-initiated request for anything within the scope of the information processing system. The following dialogue is an example of such a situation.

```
System:   From which fund would you like to transfer $4,000.00?
User:     How much do I have in the Fixed Income fund?
System:   You have $6,700.00 in the Fixed Income fund. Continuing with
          your fund transfer, from which fund would you like to transfer
          $4,000.00?
User:     What's my balance in the Large Cap fund?
System:   You have $3,700.00 in the Large Cap fund. Continuing you're
          your fund transfer, from which fund would you like
          to transfer $4,000.00?
User:     From the Fixed Income fund.
System:   Confirming your request to transfer $4,000.00 from the Fixed
          Income fund to the Growth fund. Is this correct?
User:     Yes.
```

Notably, despite the two requests for balance information being asked in the middle of the fund transfer action, the requests are treated as valid requests that could have been asked in the main menu state. Therefore, main menu-like user input received in the token gathering state is another source of user-initiated requests. The following is another example of a user-initiated request received in the token gathering state:

```
System:   From which city would you like to depart?
User:     I would like to speak to an operator.
System:   Please hold while your call is transferred.
```

In summary, a mixed-initiative system needs to interpret user-initiated requests at the main menu and interpret token input (system-initiated responses) or user-initiated requests (context independent requests) in the token gathering state.

Conventional mixed-initiative systems attempt to process all user input, that is both user-initiated requests and system-initiated responses, using a single natural language understanding (NLU) module. This NLU module can be implemented as a statistical parser built by manually annotating training data with a set of markers representing the meaning of the sentence. Using a single NLU module in this manner, however, can be problematic.

In particular, when using a single NLU module, the module must be able to interpret user-initiated requests even when the mixed-initiative system is in the token gathering state. In consequence, a complex set of annotation markers is required to coherently represent the meaning of user requests under different contexts. Direct responses to system-initiated prompts also must be represented using the same complex annotation style. This increases annotation time and the skill required to annotate the training corpus.

Additionally, a large amount of training data is required to adequately represent the same user-initiated request under multiple contexts. This increases the amount of time required to annotate the training data and train the NLU module. Further, in the token gathering state, the system is expected to learn to use context information when processing token inputs and ignore context information when processing action requests. This conflict impacts the accuracy of the NLU module, as well as the overall mixed-initiative system, causing mistakes when interpreting simple direct responses in the token gathering state.

Further, the use of a single NLU module necessitates the use of the same annotation style to interpret both user-initiated requests and system-initiated responses. This requires the NLU module to identify the action from the input, even in cases where the user is only specifying a token. Quite often, this can result in an action that does not match the specified context.

SUMMARY OF THE INVENTION

The present invention provides a method, system, and apparatus for processing user inputs within a mixed-initiative system environment. Received user inputs can be analyzed during the course of a dialogue session to determine whether the inputs specify a request for an action or tokens of information for use in performing a requested action. Based upon this determination, the received user inputs are routed to an action interpreter or a token interpreter for processing.

One aspect of the present invention can include a method of processing user dialogue in a natural language, mixed-initiative system. The method can include receiving a user input and determining whether the user input specifies an action to be performed or a token of an action. The user input can be selectively routed to an action interpreter or a token interpreter according to the determining step.

The routing step can include classifying a token determined from the user input and routing the token to one of a plurality of token interpreters according to the classifying step. For example, the classifying step can identify a token according to an action identified by the natural language, mixed-initiative system, an action corresponding to a current state of a system, whether the natural language, mixed-initiative system or an information processing system, a category of the user input such as action, token, or particular type of token, a particular domain, or sub-domain.

According to another aspect of the present invention, a first user input specifying an action can be received. The first user input can be provided to a processor configured to determine an action from received user input. A second user input can be received. A determination can be made as to whether the second user input specifies an action or a token corresponding to an action. According to the determination made, the second user input can be provided to the processor configured to determine an action or to a processor configured to determine a token from received user input.

The method also can include the step of performing the action specified by the first user input. The second user input can be determined to specify a second action to be performed. After the step of providing the first user input to a processor, the method also can include the step of determining that a token is required to perform the action specified by the first user input and querying the user for the token, for example, such that the second user input can be received in response to the token query.

Another aspect of the present invention can include a natural language, mixed-initiative system including an action interpreter configured to determine an action from a user input. The action interpreter also can determine a token from the user input. The system can include a token interpreter configured to determine, from a user input, a token to be used in performing an action. The system also can include a main menu detector. The main menu detector can distinguish a user input specifying a requested action from a user input specifying a token for performing an action. The main menu detector routes user inputs specifying actions to the action interpreter and inputs specifying tokens to the token interpreter.

Still, another aspect of the present invention can include a natural language, mixed-initiative system having an action interpreter configured to determine actions from user inputs, a plurality of token interpreters configured to determine tokens from user inputs to be used in performing actions, and an action router configured to receive actions and tokens and selectively route actions and tokens to one of the plurality of token interpreters. Notably, the action interpreter also can forward actions to the action router.

The system further can include a main menu detector configured to process context dependent data to distinguish user inputs specifying requested actions from user inputs specifying tokens for performing actions. The main menu detector routes user inputs specifying actions to the action interpreter and user inputs specifying tokens to the action router. The system also can include a classifier configured to distinguish user inputs specifying context dependent data from user inputs specifying context independent data. The classifier routes user inputs specifying context dependent data to the main menu detector and user inputs specifying context independent data to the action interpreter.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
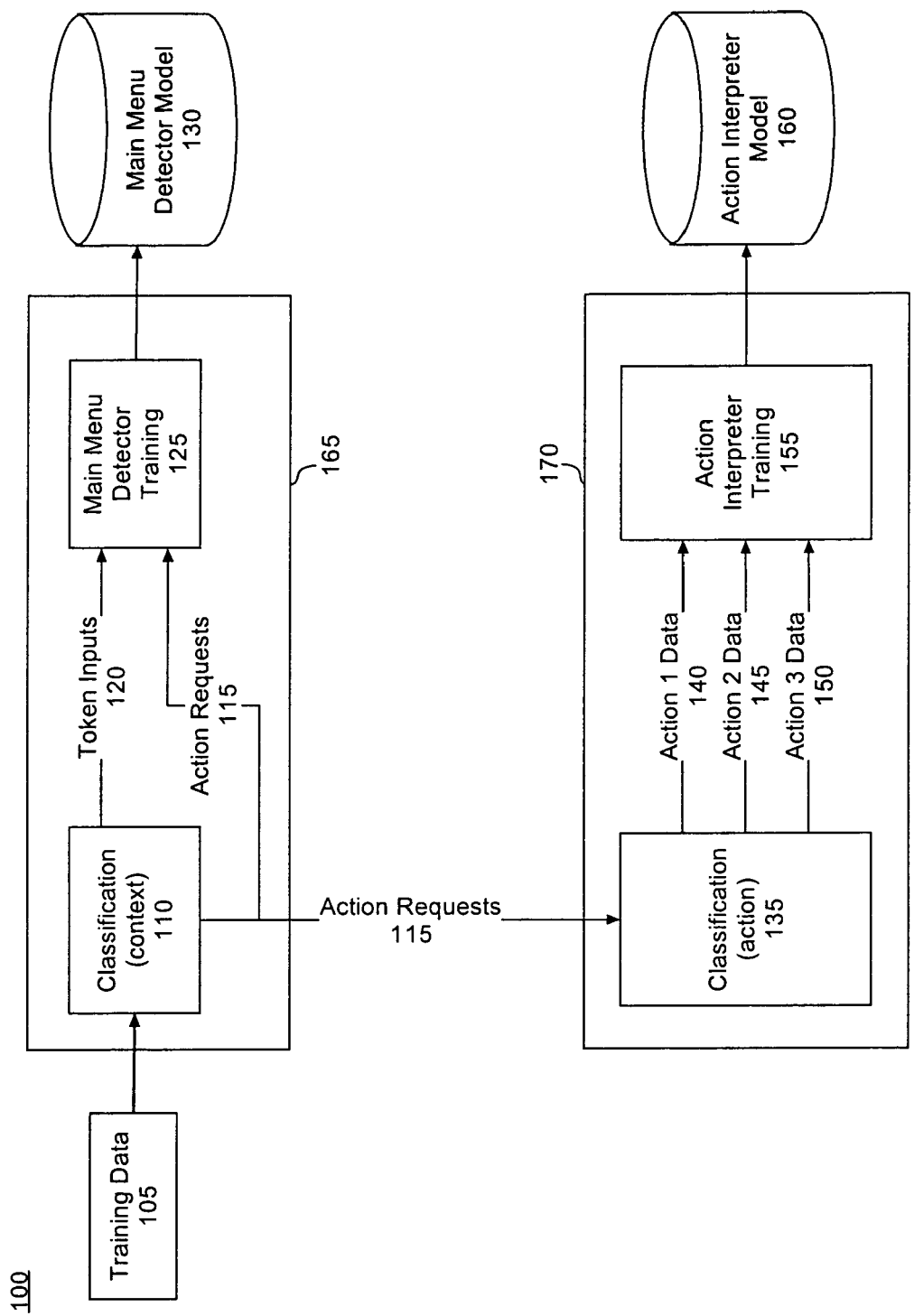
FIG. 1 is a block flow diagram illustrating a process for training a mixed initiative system in accordance with one embodiment of the inventive arrangements disclosed herein.

FIG. 1 is a block flow diagram illustrating a process 100 for training an action interpreter and main menu detector, or context dependence detector, within a natural language, mixed-initiative system (mixed-initiative system) in accordance with one embodiment of the inventive arrangements disclosed herein. Block 165 illustrates the training process for a main menu detector or context dependence detector. As shown, training data 105 can be processed through classification block 110. The training data 105 typically is a corpus of text modeling dialogue between an exemplary mixed-initiative system and a user. The training data 105 can be scripted or transcribed from a series of actual man-machine interactions.

In classification block 110, the training data 105 is classified according to context into user-initiated requests and system-initiated responses. The user-initiated requests correspond to action requests 115. Action requests refer to user instructions commanding an information processing system to perform a task for which the information processing system has been configured. For example, in the context of a financial transaction processing system, actions can include, but are not limited to, transferring money, withdrawing money, and checking the balance of an account. It should be appreciated that actions, however, can relate to any particular subject matter for which the information processing system has been adapted, whether financial transactions, booking travel arrangements, or other automated processes.

The system-initiated responses correspond to token inputs 120. Token inputs 120, or tokens of information, are parameters needed to perform an action. For example, in the context of a financial processing system, a transfer action would have tokens corresponding to the amount of money to be transferred, the source account from which money is to be withdrawn, and the destination account into which money is to be deposited. In the context of a travel system, the action of booking a flight can include tokens corresponding to a departure airport, a destination airport, the departure date, the return date, and any other pertinent details regarding the action.

In classification block 110, classification can be performed using a variety of different processing techniques. According to one embodiment of the present invention, the training data 105 can be manually inspected and classified into action requests 115 and token inputs 120. Still, a system designer can tag or annotate the training data 105 using a software-based editing tool. For example, such a tool can include a graphical user interface to view the training data 105, or portions thereof, and aid in the classification process by providing suggestions for classifying the training data based upon predetermined rules or prior classifications of like training data 105.

In another embodiment, an automated software-based classifier can be used. Such a classifier can use a model built using the classification of prior training sentences to pre-process the training data. An optional manual inspection of the classification can be performed for verification. This can be performed externally or within the tool described in the previous step.

In further illustration, an automated software-based classifier can process the training data automatically using knowledge of information pertaining to the context in which the training data was provided as well as the classification of prior training sentences or training text. Thus, if the context of a sentence or phrase of the training data 105 is different from the context of a prior training sentence classified as an action request 115, the training sentence being classified also can be classified as an action request 115. For example, within a financial information processing system, if the system prompts the user for a mutual fund name during a fund transfer action and the user asks for the balance of a mutual fund, the input asking for the balance of a mutual fund is classified as an action request. Such is the case as the initial context of performing a transfer is not the same as the context of the second training sentence relating to a balance inquiry.

If the context of a user request is the same as the previous action classification, the request can be classified as a system-initiated response or token input 120. For example, if the system prompts the user for a mutual fund name during a fund transfer action and the training data 105 indicates a user response specifying a mutual fund name, the training sentence can be classified as a system initiated response or token input 120. In this case, the latter training sentence has the same context as the initial training sentence specifying an action request 115.

In any case, the classification block 110 can be implemented using any of a variety of the different techniques described above. As such, classification block 110 can be implemented using any appropriate methodology as described herein, including various combinations thereof.

A main menu detector training block 125, using a supervised training algorithm, develops the main menu detector model 130, which can be used during runtime to distinguish between action requests and token inputs. The main menu detector training block 125 learns to distinguish between user inputs specifying action requests 115 and user inputs specifying token inputs 120. According to one embodiment of the present invention, the main menu detector training block 125 can be implemented as a statistical parser that is trained with action requests 115 annotated with main menu markers and token inputs 120 annotated with non-main menu markers.

The present invention, however, is not so limited. For example, the main menu detector training block 125 can be implemented as a neural network or a maximum entropy-based processor. The main menu detector training block 125 also can utilize a classifier based on TF-IDF or any other statistical technique. Still, the main menu detector training block 125 can be implemented using grammars or other suitable processing mechanisms. These training methodologies can be applied on the raw sentences in the training data 105, on sub-phrases (n-grams) derived from the raw sentences, or on any other processed form of the training data 105.

Block 170 illustrates the training process for an action interpreter or action classifier. Using the training data 105 that has been classified as action requests 115, the action interpreter training block 155 builds the action interpreter model 160. The action interpreter model 160 can be used during runtime to identify action requests 115 from received user inputs. To train the action interpreter training block 155, the classification block 135 classifies the action requests 115 based on the requested action implied in each request.

In classification block 135, the action requests 115 are classified by action. For example, action requests 115 are classified into Action 1 Data 140, Action 2 Data 145, Action 3 Data 150, and so on. Action requests refer to user instructions commanding an information processing system to perform a task for which the information processing system has been configured. For example, in the context of a financial transaction processing system, Action 1 Data 140 can be requests to transfer money, Action 2 Data 145 can be requests for balance information, and so on. It should be appreciated that action data, however, can relate to any particular subject matter for which the information processing system has been adapted, whether financial transactions, booking travel arrangements, or other automated processes. It also should be appreciated that the action requests 115 can be partitioned into as many categories as desired based on any criterion that can be applied to partition data, including, but not limited to, an action and/or a sub-domain.

In classification block 135, classification can be performed using a variety of different processing techniques, similar to context classification block 110.

The action interpreter training block 155 can be implemented similar to the main menu detector training block 125. That is, the action interpreter training block 155 can be implemented as a statistical parser, a neural network, a maximum entropy-based processor, or can be implemented using grammars. Still, the action interpreter training block 155 can be implemented as a classifier based on TF-IDF or any other statistical processing technique.

Figure 2:
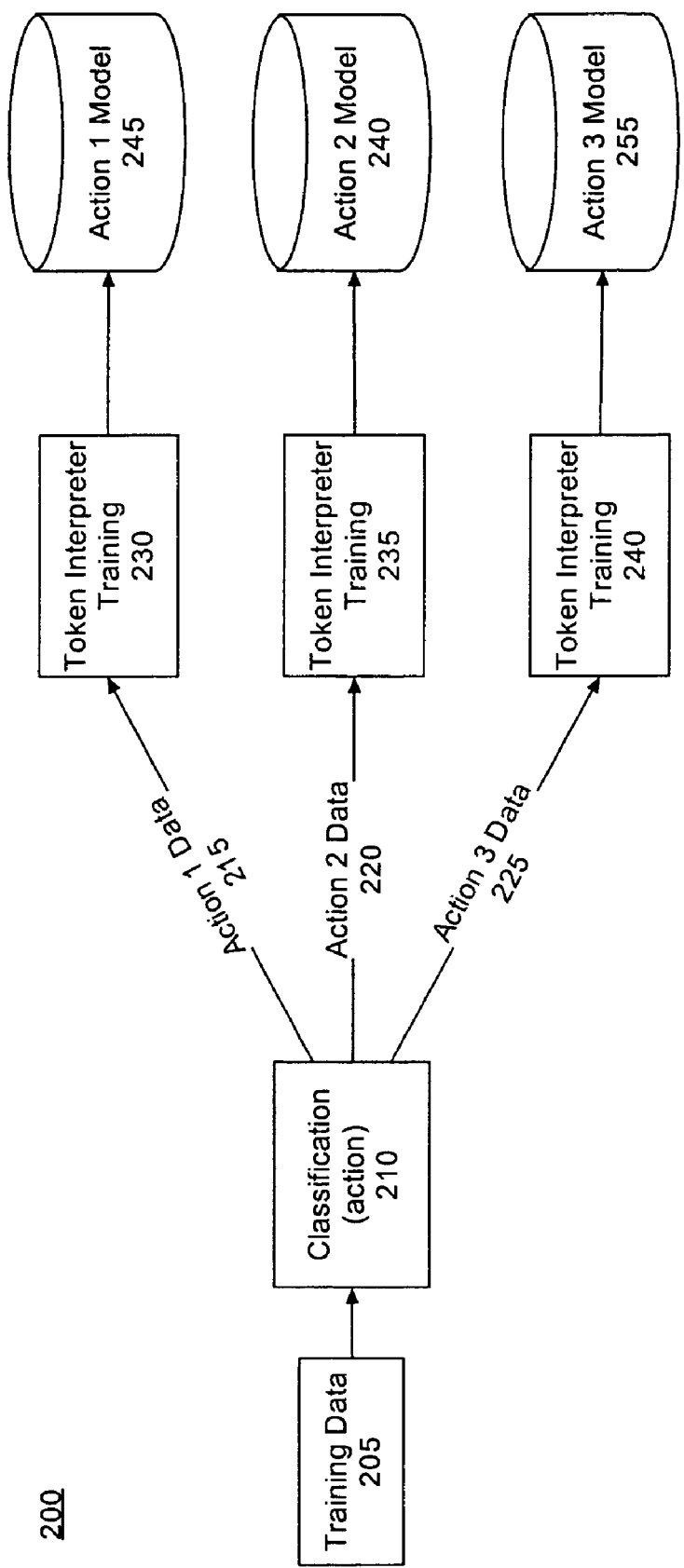
FIG. 2 is a block flow diagram illustrating a process of training token interpreters within a mixed-initiative system in accordance with one embodiment of the inventive arrangements disclosed herein.

FIG. 2 is a block flow diagram illustrating a process 200 of training token interpreters or token extractors within a mixed-initiative system in accordance with one embodiment of the present invention. As shown, training data 205 can be processed through classification block 210 according to action. In classification block 210, the training data 205 is classified into Action 1 Data 215, Action 2 Data 220, and Action 3 Data 225, and so on. In essence, classification block 210 is similar to classification block 135 of FIG. 1 as similar methods can be used to implement classification block 210.

Action 1 Data 215, Action 2 Data 220, and Action 3 Data 225 represent different data that is to be used for token extraction. According to one embodiment of the present invention, independent token interpreter training blocks 230, 235, and 240 can be trained specifically for each different data type. For example, each token interpreter training block 230, 235, and 240 can be dedicated to processing data exhibiting a particular criteria including, but not limited to, the action specified in the input, the action that corresponds to the current state of the system, whether an information processing system or the natural language understanding system, the category of the input, and/or the domain or sub-domain of the input.

It should be appreciated that the number of token interpreter training blocks used is not intended as a limitation of the present invention. For example, the system can include fewer token interpreter training blocks or more as may be desired. Thus, training data can be partitioned into as many data blocks as desired and token interpreter training blocks can be trained specifically for each block of data to develop an appropriate action model. Still, the present invention also contemplates using the same token interpreter training block for more than one data block and/or using a single token interpreter training block for all the data.

The token interpreter training blocks 230, 235, and 240 can be trained using training data 205 to determine token inputs from received user inputs. Accordingly, each can be used to develop a corresponding action model, for example action 1 model 245, action 2 model 250, and action 3 model 255 as shown. The action models can be used to process data during runtime. The token interpreter training blocks 230, 235, and 240 can be implemented similar to the main menu detector training block 125 or the action interpreter training block 155 of FIG. 1. That is, the token interpreter training blocks 230, 235, and 240 can be implemented as statistical parsers, neural networks, or maximum entropy-based processors. The token interpreter training blocks 230, 235, and 240 also can be implemented using grammars or as classifiers based on TF-IDF or any other statistical technique.

Notably, while the main menu detector training block 125, the action interpreter training block 155, and the token interpreter training blocks 230, 235, 240 can be implemented using the same processing technique, each need not be implemented like the others. Instead, if so desired, each can be implemented using a particular processing technique.

Figure 3:
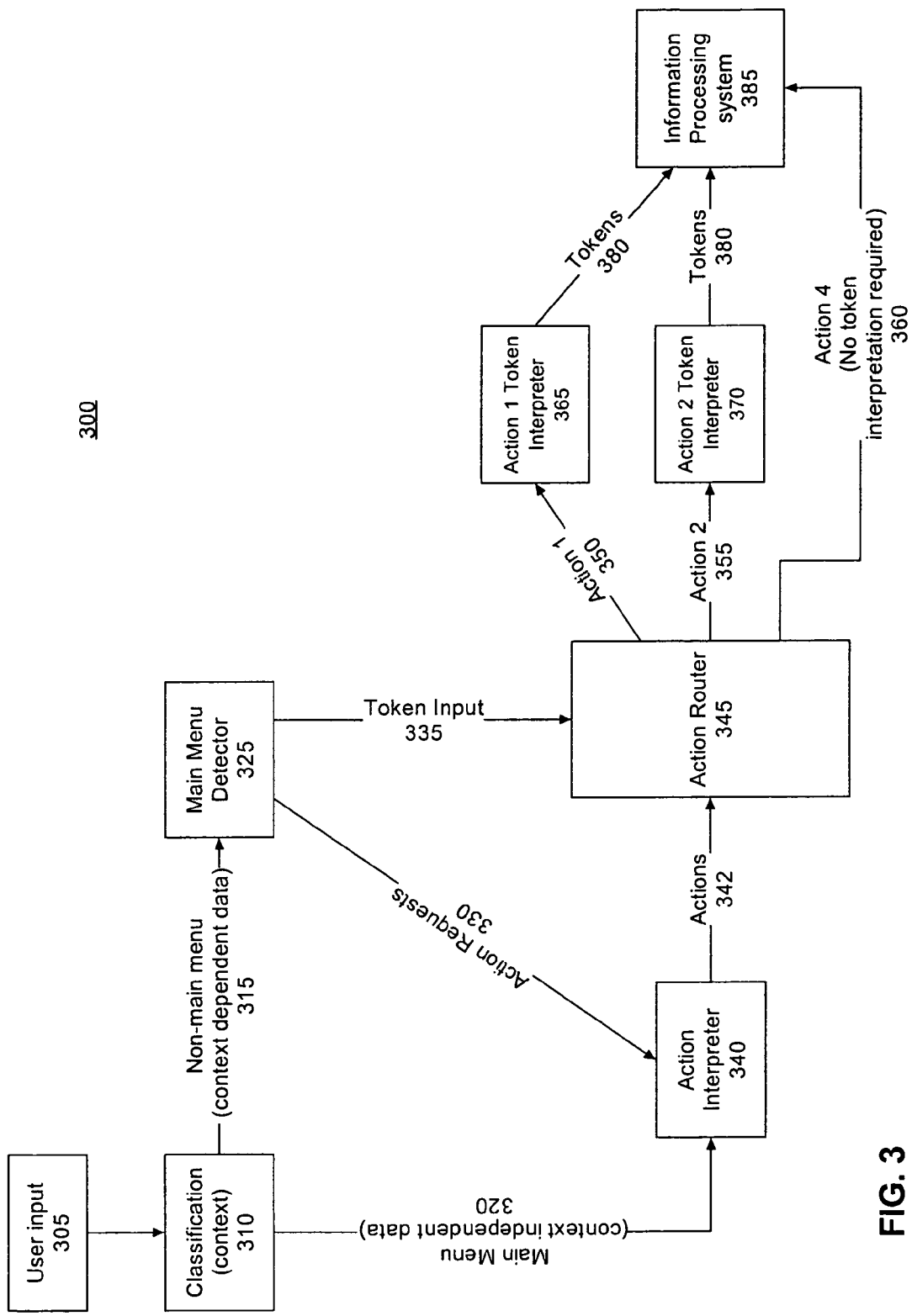
FIG. 3 is a schematic diagram illustrating a natural language, mixed-initiative system in accordance with one embodiment of the inventive arrangements disclosed herein.

FIG. 3 is a schematic diagram illustrating a mixed-initiative system 300 in accordance with one embodiment of the inventive arrangements disclosed herein. The system 300 can process user inputs using the main menu model, the action interpreter model, and one or more action models as discussed with reference to FIGS. 1 and 2. As shown in FIG. 3, the system 300 can include a main menu detector 325, an action interpreter 340, one or more token interpreters 365 and 370, an action router 345, as well as an information processing system 385.

As shown, user input data 305 can be processed through classification block 310 to generate main menu data (context independent data) 320 and non-main menu data (context dependent data) 315. Classification block 310 classifies user input data 305 based on dialog context. For example, classification block 310 can examine the dialog context returned by the information processing system 385 and determine whether the user input 305 specifies main menu data 320 or non-main menu data 330. Classification block 310 preprocesses user input 305 to identify main menu data 320 and non-main menu data 315 by examining the dialog context.

The main menu detector 325 processes non-main menu data input 315 and routes those inputs determined to be action requests 330 to the action interpreter 340 for processing. The action interpreter 340 also receives main menu data 320 in addition to the action requests 330. The action interpreter 340 determines the actions 342 specified by received user inputs and provides the actions 342 to the action router 345. The main menu detector 325 routes user inputs specifying token inputs 335 directly to the action router 345.

The action router 345, routes user requests that need token interpretation to one of the token interpreters 365 or 370 if appropriate. In addition to the token requests, these requests also can include action requests from which tokens need to be interpreted. For example, the action request, "what is my balance in the growth fund" includes the token growth fund which needs to be interpreted as a mutual fund name by one of the token interpreters.

Accordingly, the requests that need token interpretation are sent to the appropriate token interpreter 365 or 370. The action router 345 determines the appropriate token interpreter to which requests are to be sent. In some cases, the action router 345 may also determine that no token interpretation is required as shown.

The action router 345 can be implemented as a simple rule based process that determines the proper token interpreter to which a request is to be routed. Alternatively, the action router 345 can be implemented in a more complex fashion to utilize dialog information and other heuristics to route requests. In any case, routing to the token interpreters can be performed using any relevant criterion including, but not limited to, the action, sub-domain, or any other criterion.

The token interpreters 365 and 370 determine tokens 380 specified by received user inputs 305 and provide the tokens 380 to the information processing system 385.

The information processing system 385 can perform the user-specified action using the tokens as parameters of the action. The information processing system 385 can be programmed to perform a variety of actions, each of which can include tokens as parameters. Thus, while not shown, the information processing system 385 can instruct the mixed-initiative system 300 to further query a user for needed tokens as may be required to perform a user-specified action. For example, the information processing system 385 can be communicatively linked to a text-to-speech system or an audio playback system (not shown) to cause such a system to prompt the user for additional information as may be required.

Those skilled in the art will recognize that while FIG. 3 illustrates one embodiment of the present invention, other embodiments also are within the scope of the present invention. For example, a simplified system can be implemented wherein a main menu detector discerns between inputs specifying actions and inputs specifying tokens. Accordingly, the main menu detector can forward inputs specifying actions to an action interpreter, while user inputs specifying tokens can be forwarded to one or more token interpreters.

Figure 4:
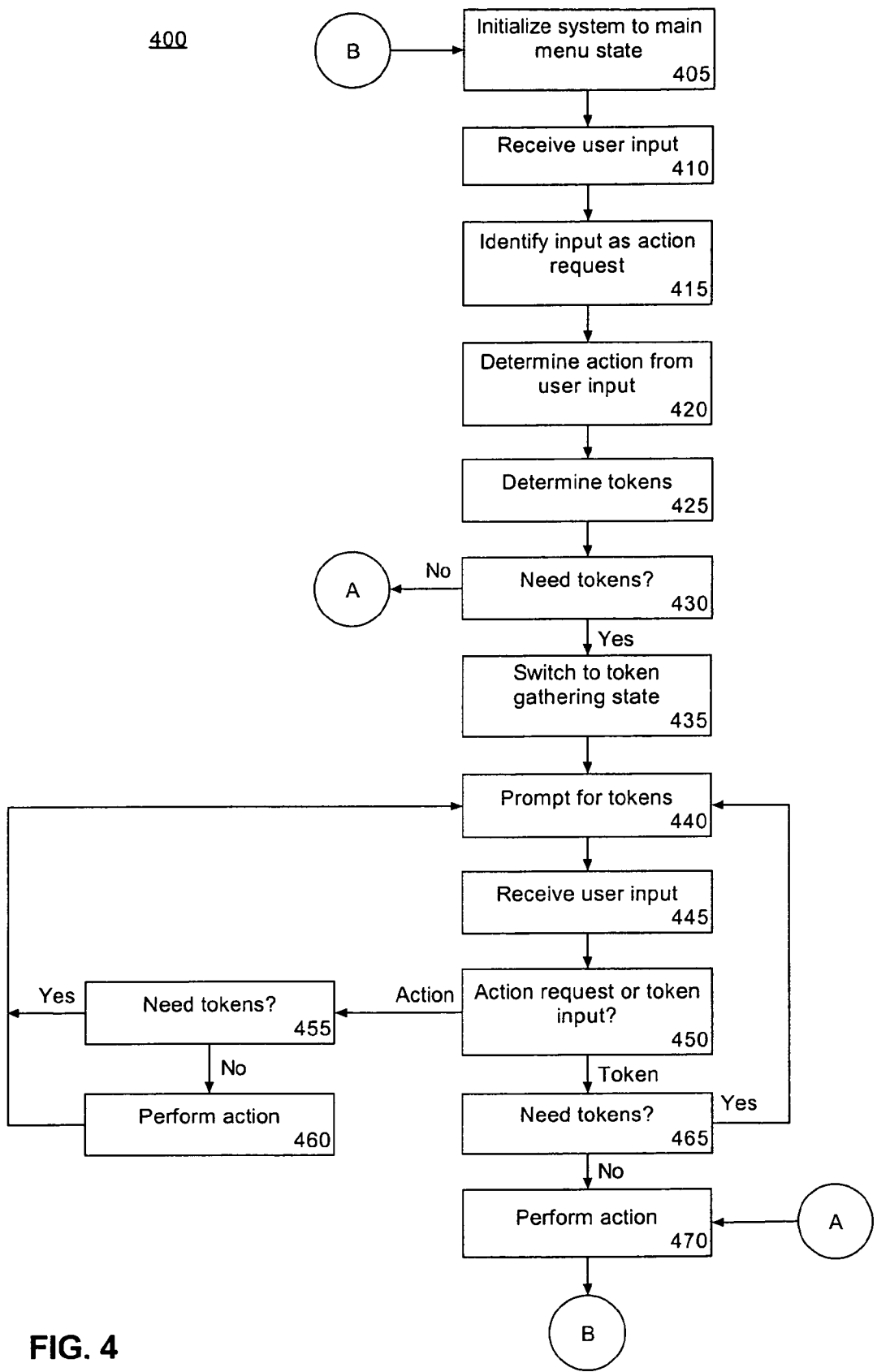
FIG. 4 is a flow chart illustrating a method of processing user requests specifying actions and tokens of information in accordance with one embodiment of the inventive arrangements disclosed herein.

FIG. 4 is a flow chart illustrating a method 400 of processing user requests specifying actions and tokens of information in accordance with one embodiment of the inventive arrangements disclosed herein. The method 400 can be implemented by the system of FIG. 3. Accordingly, the method can begin in step 405 where the system can be initialized to a main menu state. When in the main menu state, the main menu detector considers all user input received to be user-initiated input or input specifying action requests. Notably, although not shown, the user can be prompted with a general introductory greeting.

Accordingly, in step 410, a user input can be received. For example, in the context of a rental car information processing system, the user input "I would like to rent a car" can be received. In step 415, the user input can be identified or determined to be a request to perform an action. As such, the user input can be provided to the action interpreter.

In step 420, the action interpreter can determine the action specified by the user input. Continuing with the previous example, the action interpreter can identify the action of reserving or booking a rental car. The action request optionally can be sent to a token interpreter to determine from the user input any tokens of information pertaining to the action in step 425. In step 430, a determination can be made as to whether any additional tokens of information are required before the action can be performed. If not, the method can proceed to step 470 where the determined action can be performed. If, however, additional tokens are required before the user-specified action can be performed, the method can proceed to step 435.

In step 435, the system can switch to a token gathering operational state. In the token gathering operational state, the main menu detector can receive user inputs specifying either action requests or tokens of information and classify the user inputs accordingly. Thus, in step 440, the system can prompt the user for needed tokens of information. Continuing with the previous example, the system ask the user "What size car would you like?"

In step 445, another user input can be received. In step 450, the main menu detector can determine whether the received user input is a request for an action or is a token input. If the user input specifies an action request, the user input is provided to the action interpreter and the method proceeds to step 455, implying that the user has requested that a second action be performed while in the midst of processing the first action. For example, the user can respond to the token prompt asking the type of car to be rented by saying "What is the weekly rate for a sport utility vehicle?" This response would be interpreted as a price check action rather than a response indicating the token of information for which the system has asked, in this case the type of car to be rented. Notably, the context of the user response asking for weekly rate information is different than the context relating to the action of renting a vehicle.

In step 455, a determination is made as to whether further tokens are required to perform the second action. If so, the method can continue to step 440 to prompt the user to obtain the needed tokens of information. If not, the method can proceed to step 460 to perform the action. That is, the action interpreter can determine the action and provide the action to an information processing system for execution. The method then can proceed to step 440 to continue prompting the user for needed tokens of information relating to the first, unfinished requested action.

Taking the previous example, the information processing system can determine the weekly rental rate for a sport utility vehicle and respond to the user. The system can respond by saying "The weekly rate for a sport utility vehicle is $400.00 plus tax. What kind of car would you like?". The user can respond with another action request or simply provide the requested token of information. If one or more tokens are provided, the system processes the tokens of information and returns to prompting the user for the tokens required to perform the first action of renting a car.

If in step 450, the user input is determined to be a token input by the main menu detector, the action router can provide the user input to the token interpreter. For example, the user can say "A compact car". The method can continue to step 465 to determine whether further tokens are required to execute the action. If so, the method can proceed to step 440 to obtain the needed tokens. If not, the method can continue to step 470 to perform the action using the obtained tokens of information as parameters of the action. The method can loop back to step 405 to begin processing further user requests.

It should be appreciated by those skilled in the art that the various embodiments disclosed herein and the accompanying examples have been provided for purposes of illustration only and are not intended as a limitation of the present invention. For instance, as the present invention pertains to a natural language, mixed-initiative system, such a system need not prompt a user prior to receiving input. Rather, as noted, the user can respond prior to hearing a prompt, whether providing tokens of information or requesting an action. Further, the various actions described herein can require more tokens or fewer tokens as may be needed to execute the user-specified action depending upon the implementation of the information processing system used.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. In a natural language, mixed-initiative system, a method of processing user dialogue comprising the steps of:
receiving user inputs at a main menu detector, the main menu detector determining whether the user input specifies an action to be performed or a token of information for an action, wherein user inputs specifying context dependent data are routed to the main menu detector by a classifier configured to distinguish user inputs specifying context dependent data from user inputs specifying context independent data, and wherein the classifier routes user inputs specifying context independent data to an action interpreter;
for a user input determined by the main menu detector to be an action, routing the user input to the action interpreter; and
for a user input determined to be a token, routing the user input to an action router that routes the user input to one of a plurality of token interpreters that is determined by the action router to be suited for interpreting the user input.

2. The method of claim 1, further comprising:
classifying a token determined from the user input if the user input is determined to be a token; and
routing the token to one of a plurality of token interpreters according to said classifying step.

3. The method of claim 2, wherein the classifying step identifies the token according to an action identified by the system, an action corresponding to a current state of a system, a category of the user input, a particular domain, or sub-domain.

4. In a natural language, mixed-initiative system, a method of processing user dialogue comprising the steps of:
receiving at a main menu detector a first user input specifying an action, wherein user inputs specifying context dependent data are routed to the main menu detector by a classifier configured to distinguish user inputs specifying context dependent data from user inputs specifying context independent data, and wherein the classifier routes user inputs specifying context independent data to an action interpreter;
routing said first user input to an action interpreter configured to determine an action from received user input and to provide the action to an action router;
receiving a second user input;
determining whether the second user input specifies an action or a token corresponding to an action; and
providing the second user input to the processor configured to determine an action or to a processor configured to determine a token from received user input according to said determining step.

5. The method of claim 4, further comprising the step of performing the action specified by the first user input.

6. The method of claim 4, further comprising the step of determining that the second user input specifies a second action to be performed.

7. The method of claim 4, further comprising the steps of, after said step of providing the first user input to a processor, determining that a token is required to perform the action specified by the first user input and querying the user for the token.

* * * * *